J. McC. NEELY.
PIPE CLAMP.
APPLICATION FILED NOV. 23, 1920.
1,381,217.
Patented June 14, 1921.
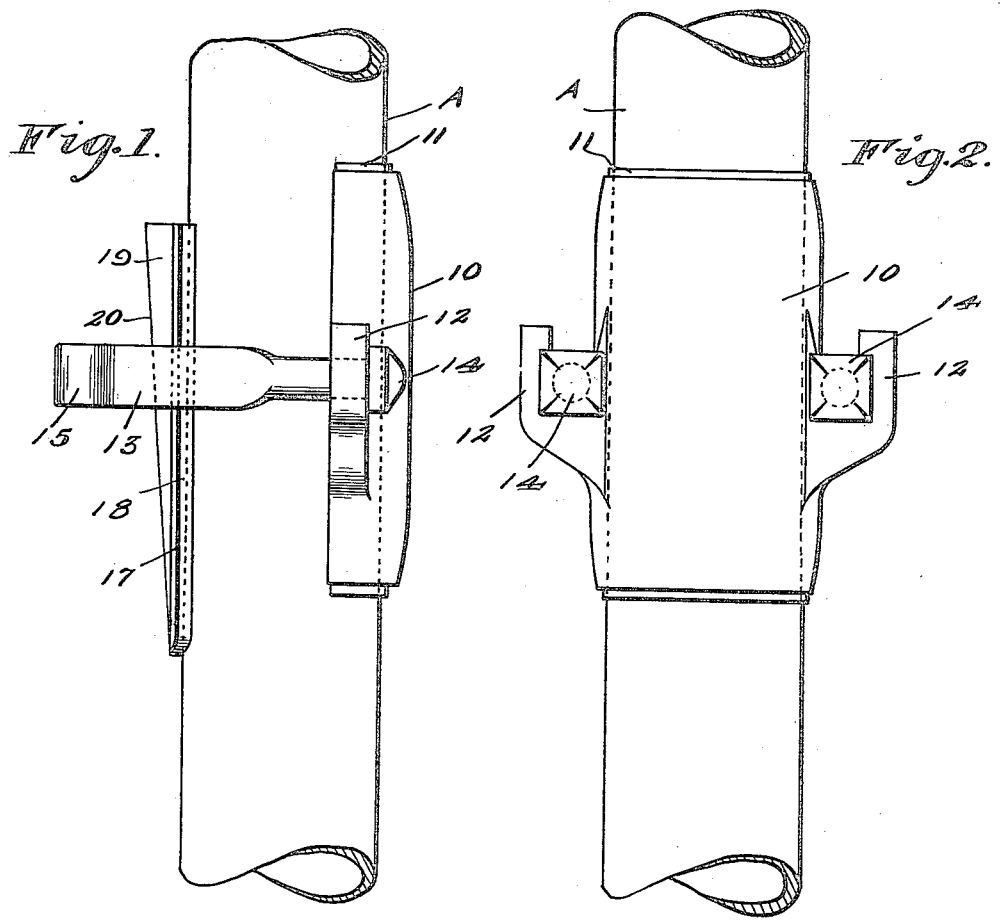
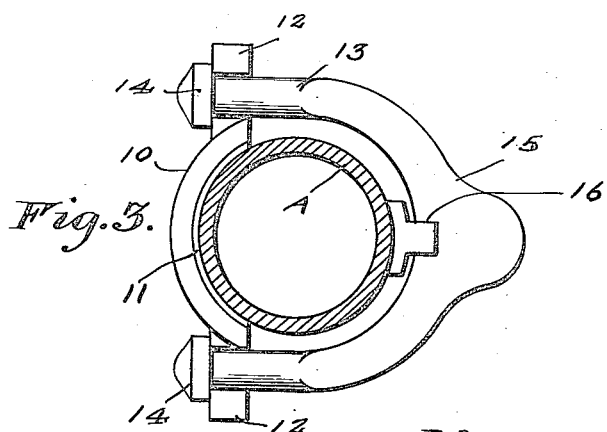
John M. Neely INVENTOR

UNITED STATES PATENT OFFICE.

JOHN McCLELLAN NEELY, OF LIMA, OHIO.

PIPE-CLAMP.

1,381,217.  Specification of Letters Patent.  Patented June 14, 1921.

Application filed November 23, 1920. Serial No. 426,072.

*To all whom it may concern:*

Be it known that I, JOHN MCCLELLAN NEELY, a citizen of the United States, residing at Lima in the county of Allen and State of Ohio, have invented new and useful Improvements in Pipe-Clamps, of which the following is a specification.

This invention relates to pipe clamps and has for its object the provision of a novel pipe clamp having a wedging action and adapted for use upon pipes of varying diameters.

A further object is the provision of a clamping device of this character which may be used in a variety of purposes as for instance, it is adapted for use in securing a pipe to a support, for suspending a pipe from a support, and also for holding together pipe sections which may be divided either longitudinally or transversely.

An important and more specific object is the provision of a pipe clamp including a saddle member, a yoke detachably connected therewith, and a wedge member insertible between the pipe, and the yoke whereby to draw the yoke and saddle member firmly into engagement with the pipe.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device,

Fig. 2 is an elevation at right angles to Fig. 1, and

Fig. 3 is a cross sectional view through the pipe showing my device in end view.

Referring more particularly to the drawings, the letter A designates a pipe to be clamped. In carrying out my invention I provide a saddle member 10 formed as an elongated plate arcuate in cross section and adapted for conforming engagement against one side of the pipe, it being preferable that a gasket or flexible packing strip 11 be interposed between the saddle member and the pipe. At its opposite edges the saddle member 10 is formed with hooks 12.

I also make use of a U-shaped yoke 13 adapted to encircle the pipe and having the end portions of its arms engaged within the hooks 12, the terminals being formed with enlarged heads 14 whereby to prevent disengagement of the yoke from the saddle member. At the center of its bight portion the outer edge of the yoke is widened, as shown at 15 and the inner edge is formed with a recess 16.

In order to hold the yoke member and saddle in clamping engagement upon the pipe, I provide a wedge member 17 which has an enlarged base portion 18 curved in cross section for conforming engagement against the pipe at a point diametrically opposite the center of the saddle member. The wedge member further includes a rib 19 engaged within the recess 16 and having an inclined outer face 20.

In assembling the device it will be seen that the saddle member and packing strip are placed against one side of the strip, the yoke member 13 is placed about the pipe with its ends engaged within the hooks 12, after which the wedge member is placed against the pipe with the narrowest end of the wedge engaged within the recess 16. The wedge member is then driven to force its wider portion into engagement with the recess which will result in clamping the parts firmly in place.

It is of course evident that the device is adapted for use in a great many connections and in a wide variety of situations. It is of course apparent that the device is admirably adapted for holding together the longitudinally divided sections of a pipe, that it may be used for clamping the meeting ends of a pair of transversely divided pipe sections, and that if the yoke member 15 be provided at its bight portion with a hole for the passage of a bolt or the like, the device may equally as well be adapted for securing a pipe in vertical, horizontal or any angular position with respect to a support and that it may be used for suspending a pipe beneath a support.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A pipe clamp comprising a saddle member having a curved face for conforming engagement with a pipe, a yoke straddlingly engaged upon the pipe and detachably connected with said saddle member, and a wedge member engaged between the bight portion of the yoke and the side of the pipe opposite the saddle member.

2. A pipe clamp comprising a saddle member disposable against one side of a pipe and formed for conforming engagement therewith, hooks formed on opposite edges of said saddle member, a yoke straddlingly engaged upon the pipe and having the ends of its arms detachably connected with said hooks, and a wedge disposed between the side of the pipe and the bight portion of the yoke.

3. A pipe clamp comprising a saddle member disposable against one side of a pipe and formed for conforming engagement therewith, hooks formed on opposite edges of said saddle member, a yoke straddlingly engaged upon the pipe and having the ends of its arms detachably connected with said hooks, and a wedge disposed between the side of the pipe and the bight portion of the yoke, the wedge member having a longitudinal rib with an inclined outer face and the inner wall of said bight portion of the yoke having a recess receiving said rib.

In testimony whereof I affix my signature.

JOHN McCLELLAN NEELY.